United States Patent
Bauer et al.

(10) Patent No.: US 6,796,411 B2
(45) Date of Patent: Sep. 28, 2004

(54) HYDRODYNAMIC CLUTCH DEVICE

(75) Inventors: Thomas Bauer, Grossbardorf (DE); Peter Frey, Gerolzhofen (DE); Christoph Sasse, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/287,200

(22) Filed: Nov. 4, 2002

(65) Prior Publication Data

US 2003/0089567 A1 May 15, 2003

(30) Foreign Application Priority Data

Nov. 15, 2001 (DE) .......................................... 101 56 041

(51) Int. Cl.[7] .............................................. F16H 45/02
(52) U.S. Cl. ..................... 192/3.29; 60/338; 192/55.61; 192/212
(58) Field of Search ............................. 192/3.28, 3.29, 192/3.3, 3.33, 55.61, 212; 464/68; 60/338

(56) References Cited

U.S. PATENT DOCUMENTS

| | | | | |
|---|---|---|---|---|
| 4,027,757 A | * | 6/1977 | Radke et al. | 192/3.29 |
| 4,382,496 A | * | 5/1983 | Yamamori et al. | 192/3.29 |
| 6,016,894 A | | 1/2000 | Kundermann | 192/3.3 |
| 6,056,093 A | * | 5/2000 | Hinkel | 192/3.29 |
| 6,264,018 B1 | * | 7/2001 | Matsuoka et al. | 192/3.29 |
| 6,354,413 B2 | * | 3/2002 | Heller et al. | 192/3.29 |
| 6,378,675 B1 | * | 4/2002 | Kundermann et al. | 192/3.27 |
| 6,575,275 B2 | * | 6/2003 | Muramatsu et al. | 192/212 |
| 6,575,276 B2 | * | 6/2003 | Fukunaga et al. | 192/3.29 |

FOREIGN PATENT DOCUMENTS

| | | | |
|---|---|---|---|
| DE | 2 118 643 A | * | 11/1983 |
| JP | 57-57958 | | 7/1982 |
| JP | 62-137431 A | * | 6/1987 |
| JP | 3-9126 A | * | 1/1991 |

* cited by examiner

*Primary Examiner*—Rodney H. Bonck
(74) *Attorney, Agent, or Firm*—Cohen, Pontani, Lieberman & Pavane

(57) ABSTRACT

A hydrodynamic clutch device comprises an impeller wheel with a plurality of impeller wheel blades arranged successively in circumferential direction about an axis of rotation, a turbine wheel which is located axially opposite the impeller wheel and which has a plurality of turbine wheel blades arranged successively in circumferential direction, a stator wheel with a plurality of stator wheel blades which are arranged successively in circumferential direction in an area between the impeller wheel blades and the turbine wheel blades and are supported on a blade carrier. The stator wheel blades, the impeller wheel blades and the turbine wheel blades define a fluid circulation zone extending substantially annularly about the axis of rotation. A torsional vibration damper arrangement has a damper element arrangement which, at least in some areas, is arranged radially inside the fluid circulation zone and overlaps axially with the fluid circulation zone. The blade carrier is shaped in such a way that it conforms at least partially to an outer contour of the damper element arrangement.

4 Claims, 3 Drawing Sheets

HYDRODYNAMIC CLUTCH DEVICE

BACKGROUND OF THE INVENTION

1. Field of the Invention

The present invention is directed to a hydrodynamic clutch device comprising an impeller wheel with a plurality of impeller wheel blades arranged successively in circumferential direction about an axis of rotation, a turbine wheel which is located axially opposite the impeller wheel and has a plurality of turbine wheel blades arranged successively in circumferential direction and a stator wheel with a plurality of stator wheel blades which are arranged successively in circumferential direction in an area between the impeller wheel blades and the turbine wheel blades and are supported on a blade carrier. The stator wheel blades, the impeller wheel blades and the turbine wheel blades define a fluid circulation zone extending substantially annularly about the axis of rotation. A torsional vibration damper arrangement has a damper element arrangement which, at least in some areas, is arranged radially inside the fluid circulation zone and overlaps axially with the fluid circulation zone.

2. Description of the Related Art

U.S. Pat. No. 6,016,894 discloses a fluid clutch wherein the turbine wheel and the impeller wheel are situated directly across from one another. A turbine wheel shell of the turbine wheel is shaped in such a way that it forms an indentation providing space for receiving a torsional vibration damper arrangement. Along with the turbine wheel shell, a central disk element of the torsional vibration damper arrangement is fixedly connected to a turbine wheel hub on the radial inner side.

JP-A-57-57958 discloses a hydrodynamic clutch device which is constructed as a hydrodynamic torque converter. The stator wheel blades which are mounted on a support are provided in the radial inner area of the turbine wheel blades and impeller wheel blades. A torsional vibration damper arrangement is positioned substantially radially inside the turbine wheel blades next to the stator wheel so as to overlap axially with the turbine wheel blades.

SUMMARY OF THE INVENTION

It is the object of the present invention to provide a hydrodynamic clutch device which provides sufficient installation space to accommodate comparatively large torsional vibration damper arrangements particularly also when a stator wheel is present.

According to the present invention, the blade carrier is shaped in such a way that it conforms at least partially to an outer contour of the damper element arrangement.

Adapting the blade carrier to the contour of the damper element arrangement and to its damper elements also makes it possible for the damper element arrangement or damper elements of the latter to penetrate into the area of the blade carrier. In this way, a larger axial overlap is possible between the area in which the fluid circulation takes place and the torsional vibration damper arrangement, so that the total required axial installation space can be reduced.

It may be provided, for example, that the damper element arrangement is constructed with a circular profile at least in the circumferential areas and that the blade carrier is provided in its radial area associated with the damper element arrangement with a concave shape adapted to the circular contour of the damper element arrangement. In this way, it can be ensured that the torsional vibration damper arrangement and the blade carrier are held in a very close fit with respect to one another.

Further, in the clutch device according to the invention, the torsional vibration damper arrangement can preferably have a central disk element at a turbine wheel hub and a cover disk element at both axial sides thereof, wherein the cover disk elements are fixedly connected to one another and one of the cover disk elements is constructed for coupling with a lockup clutch arrangement for transmission of torque and the other cover disk element is formed at least partially by a turbine wheel shell of the turbine wheel. In this way, the turbine wheel and the torsional vibration damper arrangement are merged with respect to function and components.

It can also be provided that the central disk element and the cover disk elements have interaction areas for application of force upon the damper elements of the damper element arrangement and that the interaction areas provided at the other cover disk element are formed by portions which are shaped or punched or formed in the like manner at the cover disk element.

In order to prevent lateral deflection of the various damper elements of the damper element arrangement without having to provide additional structural component parts, it is suggested that the turbine wheel shell forms a support for the damper element arrangement in an area between two interaction areas of the other cover disk element.

Even when interaction areas are provided at the turbine wheel shell, impairment of stability in the area of the turbine wheel is comparatively minor when the interaction areas provided at the other cover disk element cooperate with the associated damper elements of the damper element arrangement in an angular range of 70°–110°, preferably about 90°, of the damper elements which are constructed with an approximately circular contour. Particularly when sheet metal material is used for the different cover disk elements or turbine wheel shell, it can be provided for increased stability chiefly in the areas which are acted upon by the damper elements that at least one of the cover disk elements comprises hardened sheet metal material at least in its interaction areas, preferably sheet metal material which is hardened by gas nitriding.

Hydrodynamic clutch devices are used in a wide variety of vehicles. Since different technical requirements and different price considerations exist for use in different vehicles, it may be necessary, depending on the type of vehicle, to use hydrodynamic clutch devices with or without a torsional vibration damper arrangement. In order to minimize as far as possible the quantity of parts which the producer of such clutch devices must keep on hand, it is suggested that the central disk element is fixedly connected to the two cover disk elements while omitting the damper elements of the damper element arrangement in a manner which essentially prohibits a relative rotational movement between the central disk element and the cover disk elements. Accordingly, in the hydrodynamic clutch arrangement according to the invention in which the damper element arrangement, i.e., essentially the damper springs, is omitted, this means that, with the exception of the latter, the same structural component parts are used, that is, structural component parts which are actually constructed in principle for incorporating damper elements and damper springs, but which are connected to one another so as to be fixed with respect to relative rotation even when torque transmission does not or can not take place by means of the damper elements which are no longer present.

According to another feature of the present invention, the damper element arrangement is arranged so as to overlap axially with the stator wheel blades.

According to another feature of the present invention, this invention is directed to a hydrodynamic clutch device comprising an impeller wheel with a plurality of impeller wheel blades arranged successively in circumferential direction about an axis of rotation, a turbine wheel which is located axially opposite the impeller wheel and has a plurality of turbine wheel blades arranged successively in circumferential direction, wherein the turbine wheel has a turbine wheel shell having the turbine wheel blades and a turbine wheel hub which can be coupled or is coupled with a driven member for common rotation, wherein the turbine wheel shell and the turbine wheel hub are constructed so as to interact with damper elements of a damper element arrangement.

It is further provided that the turbine wheel shell and turbine wheel hub are fixedly connected to one another so as to prohibit relative rotation.

According to another feature of the present invention, this invention is directed to a hydrodynamic clutch device comprising an impeller wheel with a plurality of impeller wheel blades arranged successively in circumferential direction about an axis of rotation, a turbine wheel which is located axially opposite the impeller wheel and has a plurality of turbine wheel blades arranged successively in circumferential direction, wherein the turbine wheel has a turbine wheel shell having the turbine wheel blades and a turbine wheel hub which can be coupled or is coupled with a driven member for common rotation, a torsional vibration damper arrangement with a plurality of damper elements supported at a central disk element which is provided on the turbine wheel hub and at cover disk elements which are provided on both sides of the central disk element and which are fixedly connected to one another for transmission of torque between the central disk element and the cover disk element.

In this connection, it is further provided that the component group comprising the cover disk elements is supported or can be supported in radial direction with respect to the component group comprising the central disk element by a plurality of members which fixedly join the cover disk elements to one another and/or that the component group comprising the cover disk elements is supported or can be supported in radial direction with respect to the component group comprising the central disk element by radial support of an inner circumferential area of at least one of the cover disk elements at the component group comprising the central disk element.

A construction of this type makes possible a reliably acting radial bearing support for the two essential areas of the torsional vibration damper arrangement with respect to one another without requiring structural component parts taking up additional installation space.

For example, a radial bearing surface which is preferably formed by cutting can be provided at the central disk element and the at least one cover disk element can be brought into contact at this radial bearing surface in radial direction. Alternatively or in addition, it is possible that a bearing surface which faces radially inward and which can be supported in radial direction on the component group comprising the central disk element is formed on at least one of the cover disk elements by bending.

In another construction which can be realized in a very simple manner and which ultimately requires no additional machining steps, it can be provided that the two cover disk elements are fixedly connected with one another by connection pin elements which penetrate the central disk element in openings extending in circumferential direction and which are supported or can be supported at the central disk element in radial direction.

One of the cover disk elements can be constructed for torque transmission coupling with a lockup clutch arrangement and the other cover disk element can be formed at least partially by a turbine wheel shell of the turbine wheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
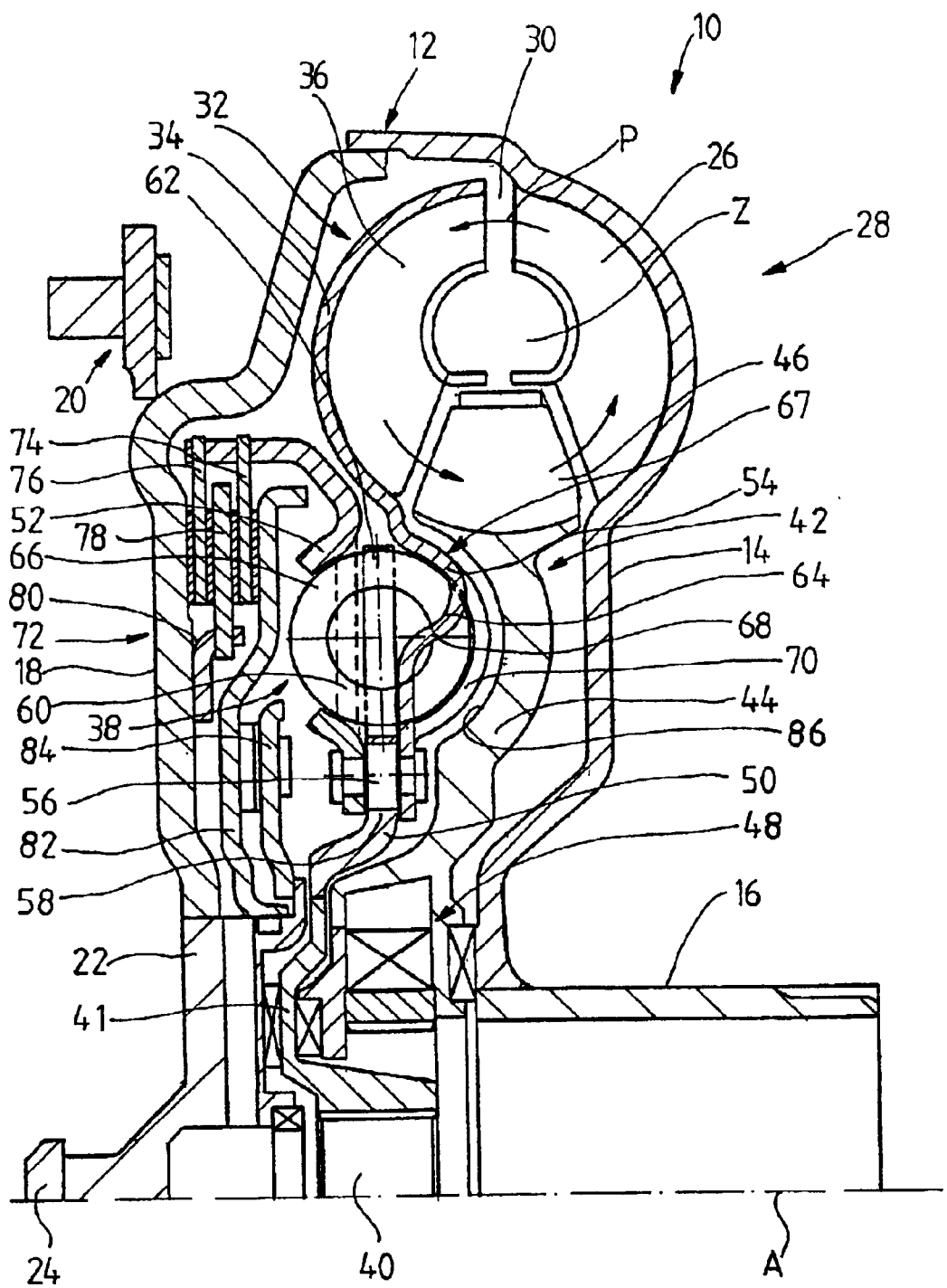
FIG. 1 shows a partial longitudinal sectional view through a hydrodynamic clutch device according to the invention.

FIG. 1 shows a hydrodynamic clutch device 10 which is constructed as a hydrodynamic torque converter. The hydrodynamic clutch device 10 comprises a housing arrangement 12 with an impeller wheel shell 14 which is fixedly connected in its radial inner area to an impeller wheel hub 16 by welding, for instance. On the radial outer side, the impeller wheel shell 14 is connected with a housing cover 18 by welding, for instance. A plurality of elements 20 by which the housing arrangement 12 can be connected to a driveshaft, not shown, so as to be fixed with respect to relative rotation are provided at the housing cover 18. On the radial inner side, a housing hub 22 with a bearing journal 24 which can be introduced into a corresponding recess of the driveshaft is provided at the housing cover 18.

In the radial outer area, the impeller wheel shell 14 has at its inner side a plurality of impeller wheel blades 26 which are arranged successively in circumferential direction about an axis of rotation A. Together with these impeller wheel blades 26 and the impeller wheel hub 16, the impeller wheel shell 14 essentially forms a pump wheel 28.

A turbine wheel 32 is provided in the interior space 30 enclosed by the housing arrangement 12. This turbine wheel 32 has a turbine wheel shell 34 with a plurality of turbine wheel blades 36 arranged successively in circumferential direction about the axis of rotation A at its outer circumferential area on the side facing the impeller wheel 28. The turbine wheel shell 34 extends radially inward and is coupled to a turbine wheel hub 40 by a torsional vibration damper arrangement which is described in the following and is designated in general by 38. The turbine wheel hub 40 can be connected with a driven member, for instance a driven shaft, so as to be fixed with respect to rotation relative to it.

A stator wheel 42 is positioned axially between the turbine wheel 32 and the impeller wheel 28. This stator wheel 42 comprises a stator wheel ring 44 serving as a blade carrier. A plurality of stator wheel blades 46 which are arranged successively in circumferential direction are fitted to the outer circumferential area of the stator wheel ring 44 in such a way that they are positioned between the radial inner area of the turbine wheel blades 36 and the impeller wheel blades 26. The stator wheel ring 44 can be positioned on the radial inner side by a freewheel arrangement, designated generally by 48, on a support element, not shown, e.g., a supporting hollow shaft arranged concentric to the impeller wheel hub 16, so that the stator wheel 42 or stator wheel ring 44 can rotate with the stator wheel blades 46 supported on it about an axis of rotation A only in one rotating direction, but is prevented from rotating in the other rotating direction.

The area which is enclosed by the radial outer area of the impeller wheel shell 14, the radial outer area of the turbine wheel shell 34 and the radial outer area of the stator wheel ring 44 and which also substantially contains the various blades 26, 36 and 46 essentially forms a fluid circulation zone Z in which the working fluid contained in the interior space 30 circulates in the manner indicated by arrows P in the torque transmission mode or torque increasing mode. Accordingly, this fluid circulation zone Z has a circular sectional profile and extends annularly around the axis of rotation A.

The torsional vibration damper arrangement 38 comprises a central disk element 50 which substantially forms a component part of the turbine wheel hub 40. In the present example, the central disk element 50 is constructed as a separate structural component part which can be connected with the part 41 for coupling to a driven member so as to be fixed with respect to rotation relative to it, e.g., by welding. Of course, it is also possible to provide the turbine wheel hub as an individual integral structural component part. However, for technical reasons pertaining to manufacture, it may be advantageous to produce the central disk element 50 separately from sheet metal and to produce the radially inner part 41 for coupling to the driven member by a casting process, for example, or by cutting. Of course, this part 41 could also be drawn from sheet metal part.

Cover disk elements 52, 54 are provided on both sides of the central disk element 50. The two cover disk elements 52, 54 are fixedly connected to one another in their radial inner area by rivet pins 56 received in apertures 58 which are provided in the central disk element 50 and which extend in elongated manner in circumferential direction. At the same time, the support of these pins 56 at the surface of the central disk element 50 that faces radially outward and defines the apertures 58 forms a radial bearing support for the component group comprising the central disk element 50, that is, essentially the turbine wheel hub 40, with respect to the component group comprising the two cover disk elements 52, 54. At the same time, a rotational angle-defining function can be achieved by the cooperation of the pins 56 with the openings 58.

Circumferential supporting areas 60, 62, 64 are provided at the two cover disk elements 52, 54 and at the central disk element 50 in a manner known per se, the damper springs 66 of a damper element arrangement 67 of the torsional vibration damper arrangement 38 being supported at these circumferential supporting areas 60, 62, 64 essentially in circumferential direction. Further, it will be seen that the cover disk element 54 is formed by a radial inner area of the turbine wheel shell 34. In the area in which the damper springs 66 are also arranged, this turbine wheel shell 34 is curved so as to match the circular outer circumferential contour of the damper springs 66 and has tab-shaped portions 68 to provide supporting areas 64. For this purpose, slots can be punched into the sheet metal blank which is provided for forming the turbine wheel shell 34, these slots providing the individual areas for shaping or forming the shaped portion 68. The radial inner area of the turbine wheel shell 34 forms supports 70 for the damper springs 66 between shaped portions 68 of this type.

The cover disk element 52 is constructed in its radial outer area for coupling to a lockup clutch arrangement, designated generally by 72. For example, it can have a toothlike driving contour which engages or can be made to engage in a rotational driving engagement with the corresponding contours of friction plates 74, 76. A counter-friction plate 78 located between the two friction plates 74, 76 is connected via a coupling element 80 to the housing cover 80 so as to be fixed with respect to rotation relative to it. A clutch piston 82 which is connected by a rotational driving arrangement 84 to the housing hub 22 so as to be fixed with respect to rotation but axially displaceable relative to it presses the plates 74, 76, 78 against one another and against the housing cover 18 when the fluid pressure is increased in the chamber area containing the fluid circulation zone Z. In this manner, a torque transmission connection is produced between the housing arrangement 12 and the input side of the torsional vibration damper arrangement 38 comprising the two cover disk elements 52, 54.

Due to the fact, already mentioned, that the cover disk elements 52, 54 are preferably formed from sheet metal material by punching and shaping for technical reasons pertaining to manufacture, but contact surfaces for supporting the damper springs 66 relative to torque transmission are provided at these structural component parts, it is advantageous when these sheet metal parts are hardened at least in the areas acted upon for supporting the damper springs 66. This can be carried out, for example, by gas nitriding.

It will further be seen in FIG. 1 that the area of the stator wheel ring 44 located radially in the area of the damper springs 66 conforms to the outer contour of the damper springs 66 and accordingly also to the contour of the turbine wheel shell 34 and supports 70 provided in this area. The stator wheel ring 44 has an indentation 86 in this area which partially receives the damper springs 66. In this way, it is possible that the torsional vibration damper arrangement 38 overlaps almost completely with the fluid circulation zone Z even with springs of comparatively large dimensions, i.e., damper springs 66 with a comparatively large spring diameter. Accordingly, this means that an essential feature of the present invention is that the damper springs 66 penetrate axially into the area in which the stator wheel blades 46 are also positioned.

Figure 2:
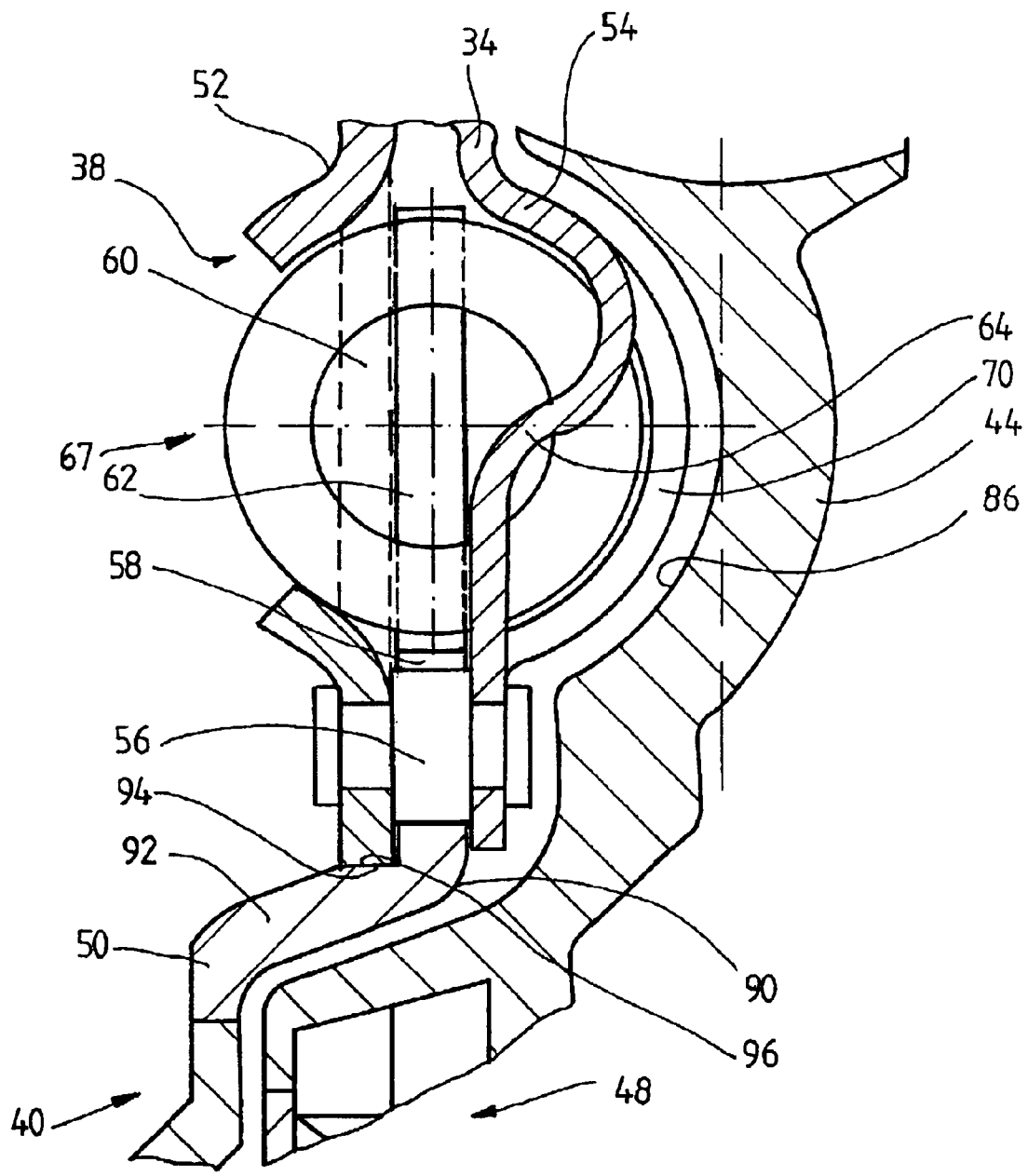
FIG. 2 shows a modification of the clutch device shown in FIG. 1.

FIG. 2 shows a modification of the embodiment form according to the invention shown in FIG. 1. In particular, a different type of radial bearing support of the cover disk elements 52, 54 with respect to the central disk element 50 is provided in this case. It will be seen that on the radial inner side of the openings 58 the central disk element 50 passes into a portion 92 which also extends in axial direction and which substantially bridges the radial inner area of the stator wheel ring 44 and freewheel arrangement 48. In the outer circumferential area, a bearing surface 96 is formed on the radial outside, e.g., by cutting or the like, at a portion located across from an inner circumferential surface 94 of the cover disk element 52, the cover disk element 52 being supported or supportable radially by its surface 94 at this bearing surface 96. Since the two cover disk elements 52, 54 are fixedly connected with one another by the pins 56, the entire component group comprising the cover disk elements 52, 54 and accordingly also the radial outer area of the turbine wheel shell 34 and the turbine wheel blades 36 is supported in radial direction with respect to the central disk element 50 or the component group comprising the latter, namely, the component group comprising the turbine wheel hub 40. It may also be advantageous that the structural component parts having frictional interaction with each other are hardened in these areas, e.g., by means of gas nitriding or other hardening methods.

As in the previously described embodiment form, a bearing support which does not require any additional structural component parts is achieved in the variant shown in FIG. 2.

Figure 3:
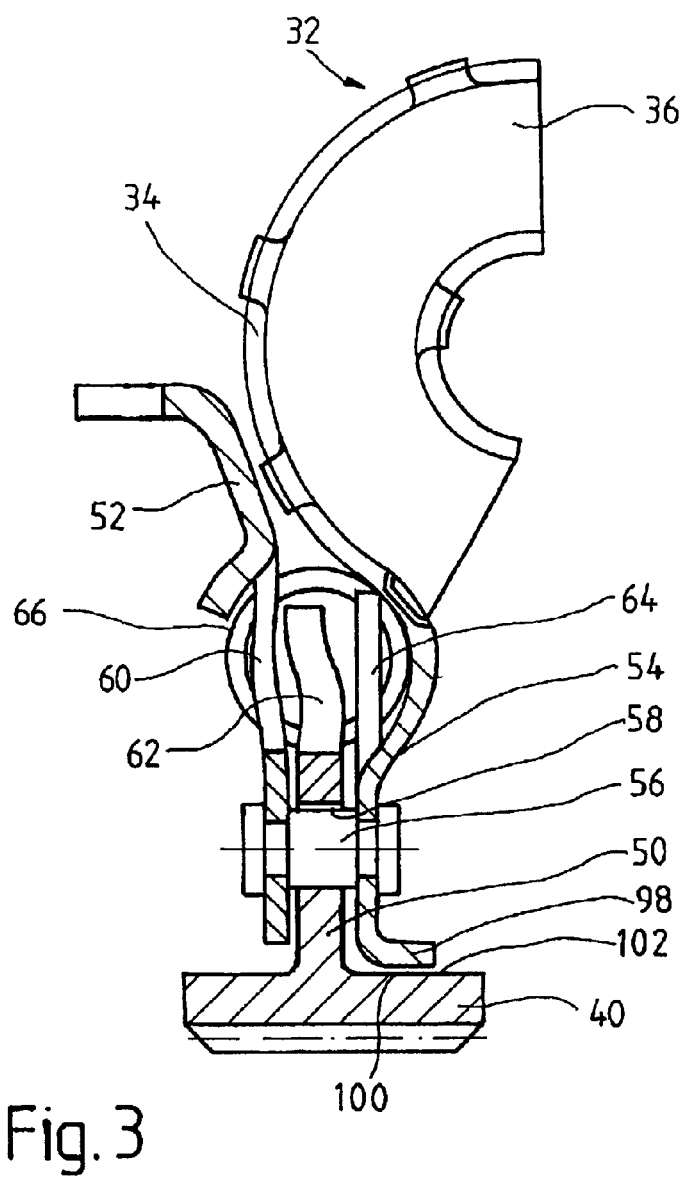
FIG. 3 shows a detailed view of a turbine wheel assembly according to an alternative construction.

Another modification of the hydrodynamic clutch device 10 according to the invention can be seen in FIG. 3. FIG. 3 essentially shows the torsional vibration damper arrangement 38 with associated component groups.

The drawing shows an integral construction of the turbine wheel hub 40. Further, it will be seen that the supporting areas 64 of the cover disk element 54 formed by the radial inner area of the turbine wheel shell 34 are formed by portions of the cover disk element 54 which extend approximately in a straight line radially outward. These portions can be provided in that U-shaped slots are punched into the blank used to produce the turbine wheel shell 34 so as to open radially inward. The U-shaped slots define the outline of the supporting areas 64 which are then connected to the remaining sheet metal material of the cover disk element 54 only in their radial inner area, but are essentially open in axial direction in the radial outer area.

In this embodiment form, the bearing support of the component group comprising the two cover disk elements 52, 54 can be provided by the radial inner area of the cover disk element 54 and the turbine wheel shell 34. In this case, an approximately cylindrical, axial bend 98 can be provided whose inner circumferential surface 100 is located opposite an outer circumferential surface 102 of the turbine wheel hub 40 and can accordingly be supported on the latter in radial direction. In this case also, no additional structural component parts are needed for providing the radial bearing function. Lubrication is ensured in all of the above-described embodiment forms of the radial bearing support in which structural component parts enter into frictional interaction with one another due to the fact that the interior of the housing arrangement 12 is filled with fluid. Therefore, there is no risk of wear.

Figure 4:
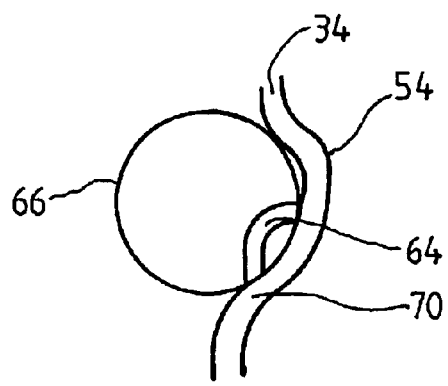
FIG. 4 shows a detailed view of a turbine wheel shell constructed for interaction with damper springs.

As will be seen from FIG. 4, the supporting areas 64 which are formed at the turbine wheel shell 34 and cover disk element 54 by shaping are, like the embodiment form according to FIG. 2, provided in such a way that they are connected on the radial inner side and radial outer side to the remaining sheet metal material. However, it will be seen in the embodiment form according to FIG. 4 when considering the circular outer contour of the damper springs 66, only indicated schematically, that only a comparatively small angle segment of about 90° of this circular contour cooperates with the supporting areas 64 provided at the cover disk element 54. In the other circumferential area, a radial or axial supporting function can be provided for the damper springs 66 by the cover disk element 54 in the area of the supports 70. Also, by providing the support only in a comparatively small annular segment of the circumferential contour of the damper springs 66, it is possible to transfer the forces or torque occurring in operation; as a result, the weakening (caused by the shaping and also partly by the slots and interruptions formed by punching or cutting) of the turbine wheel shell 34 which must transmit the full torque particularly in torque-converting mode is kept to a minimum.

Particularly with regard to preventing the weakening of the turbine wheel shell 34, it is noted that the supporting areas 64 can also be formed in that indentations or projecting areas at which the damper springs 66 can be supported in circumferential direction are formed through the use of corresponding shaping tools without introducing notches or slots in the sheet metal blanks for the turbine wheel shell 34.

Another essential feature of the hydrodynamic clutch device constructed according to the invention is that this hydrodynamic clutch device can vary in construction. In the variants shown in the preceding description, a vibration damping function is provided in the area between the turbine wheel shell and turbine wheel hub and the area between the lockup clutch arrangement and turbine wheel hub by incorporating damper springs. However, for reasons of cost or unanticipated oscillations excited in different drive systems, it may be advantageous to refrain from the use of a vibration damping function of this kind. In this case, the clutch device according to the invention can be implemented in such a way that only the integration of damper springs 66 is omitted in the assembly of the clutch device. The other components are produced and assembled as shown in the drawings. This means that the two cover disk elements 52, 54 are fixedly connected to one another by rivet pins 56 and are also fixedly connected to the central disk element 50. It may be advantageous in this case to use pins which do not have the thickened central area shown in the drawings which retains a slight axial play between the cover disk elements 52, 54 and the central disk element 50. Further, it can be advantageous to provide this rivet connection in areas of the central disk element 50 in which there are no elongated openings but, rather, openings which are adapted essentially to the outer circumferential dimensioning of the pins 56. These openings can be inserted or are inserted, for example, between elongated openings 68 provided for the variant with damper springs 66. In this case, a manufacturer of devices of this kind need not stock different components for variants with and without the damping function, which contributes to considerable savings in storage and in the production of different structural component parts.

It is noted that particularly the construction of the areas cooperating with the damper springs and the manner in which the cover disk elements are connected to the central disk element may be realized not only in a hydrodynamic clutch device such as that described above but, of course, can also be realized in a hydrodynamic clutch device which is constructed in the manner of a fluid clutch, that is, without a stator wheel.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic clutch device comprising:

an impeller wheel having a plurality of impeller wheel blades arranged circumferentially about an axis of rotation;

a turbine wheel located axially opposite the impeller wheel and having a turbine wheel shell and a plurality of turbine wheel blades arranged circumferentially about said axis of rotation;

a stator wheel comprising a blade carrier supporting a plurality of stator wheel blades arranged circumferentially about said axis of rotation between said impeller wheel blades and said turbine wheel blades, wherein said stator wheel blades, said impeller wheel blades, and said turbine wheel blades define a fluid circulation zone extending annularly about said axis of rotation; and a torsional vibration damper arrangement comprising a central disk element fixed to a turbine wheel hub, a pair of cover disk elements on opposite axial sides of said central disk element, and a damper element arrangement between the central disk element and the cover disk elements, wherein damper element arrangement axially overlaps said fluid circulation zone and is at least partially radially inside said fluid circulation zone, said cover disk elements being fixed to each other, one of said cover disk elements being constructed for coupling to a lockup clutch, the other said cover disk element being formed at least partially by said turbine wheel shell, wherein said central disk element and said cover disk elements each have interaction areas for applying force to the damper element arrangement between the central disk element and the cover disk elements, the other said cover disk element being punched and shaped to form a pair of interaction areas and a support between said interaction areas for supporting said damper element arrangement, wherein said blade carrier has a profile which at least partially conforms to said damper element arrangement.

2. A hydrodynamic clutch arrangement as in claim 1 wherein said damper element arrangement has a circumferential area with a circular profile, said blade carrier having a radial area with a concave profile which conforms to the circular profile of the damper element arrangement.

3. A hydrodynamic clutch device as in claim 1 wherein said damper element arrangement comprises a plurality of damper elements, each damper element having a circular contour, said interaction areas of the other said cover disk element conforming to said damper elements over an angular range of 70 to 110 degrees of said circular contour.

4. A hydrodynamic clutch device as in claim 1 wherein at least one of said cover disk elements comprises hardened sheet metal material in said interaction areas.

* * * * *